(12) United States Patent
Kanai

(10) Patent No.: US 7,558,704 B2
(45) Date of Patent: Jul. 7, 2009

(54) METHOD AND DEVICE FOR TIME VERIFYING MEASUREMENT DATA

(75) Inventor: Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/624,447

(22) Filed: Jan. 18, 2007

(65) Prior Publication Data

US 2007/0179748 A1    Aug. 2, 2007

(30) Foreign Application Priority Data

Jan. 27, 2006 (JP) .............................. 2006-019450

(51) Int. Cl.
*G06F 17/40* (2006.01)
(52) U.S. Cl. ..................................... 702/187
(58) Field of Classification Search .................. 702/187
See application file for complete search history.

(56) References Cited

U.S. PATENT DOCUMENTS

| | | | |
|---|---|---|---|
| 6,889,324 B1 * | 5/2005 | Kanai et al. ................. | 713/176 |
| 7,143,144 B2 | 11/2006 | Kanai et al. | |
| 2004/0022523 A1 * | 2/2004 | Duerr et al. .................. | 386/94 |
| 2004/0107356 A1 | 6/2004 | Shamoon et al. | |
| 2004/0125402 A1 | 7/2004 | Kanai et al. | |
| 2004/0128555 A1 | 7/2004 | Saitoh et al. | |
| 2004/0131184 A1 * | 7/2004 | Wu et al. .................... | 380/202 |
| 2005/0021980 A1 | 1/2005 | Kanai | |
| 2005/0028192 A1 * | 2/2005 | Hooper et al. ................ | 725/31 |
| 2005/0114677 A1 | 5/2005 | Kanai | |
| 2005/0141010 A1 | 6/2005 | Kanai | |
| 2005/0166044 A1 | 7/2005 | Kanai et al. | |
| 2005/0166057 A1 * | 7/2005 | Kanai et al. ................. | 713/176 |
| 2006/0047481 A1 | 3/2006 | Kanai | |
| 2006/0095566 A1 | 5/2006 | Kanai | |

(Continued)

FOREIGN PATENT DOCUMENTS

EP          0 752 786 A1       1/1997

(Continued)

OTHER PUBLICATIONS

Alejandro James, et al., "Learning Personalized Video Highlights from Detailed Mpeg-7 Metadata", Proceedings 2002 International Conference on Image Processing, XP010607278, vol. 2, Sep. 22, 2002, pp. 133-136.

*Primary Examiner*—Bryan Bui
*Assistant Examiner*—Jonathan Teixeira Moffat
(74) *Attorney, Agent, or Firm*—Oblon, Spivak, McClelland, Maier & Neustadt, P.C.

(57) ABSTRACT

A disclosed measuring device generates measurement data recorded by continuously measuring measurement information. Divided data items are generated by dividing the measurement data. A feature quantity representing each of the divided data items generated is acquired. A time stamp is acquired based on measurement time data, where the measurement time data include the feature quantities and measurement time identification information of each of the divided data items, the measurement time identification information expressing a measurement time of each of the divided data items on a predetermined time axis. An electronic signature is generated for the measurement time data and the time stamp by using a private key specific to the measuring device. The measurement time data, the time stamp, and the electronic signature are saved in association with the measurement data.

21 Claims, 17 Drawing Sheets

U.S. PATENT DOCUMENTS

2006/0265599 A1   11/2006   Kanai

FOREIGN PATENT DOCUMENTS

| JP | 2000-215379 | 8/2000 |
| JP | 2003-323357 | 11/2003 |
| JP | 2005-45486 | 2/2005 |
| JP | 2005-51734 | 2/2005 |
| JP | 2006-319452 | 11/2006 |

* cited by examiner

FIG.8

| HASH VALUE | RELATIVE START TIME | RELATIVE END TIME |
|---|---|---|
| h1 | 00:00 | 00:10 |
| h2 | 00:10 | 00:20 |
| h3 | 00:20 | 00:30 |
| .. | .. | .. |
| hn | 02:50 | 03:00 |
| adj | 03:00 | 17:00 | hla

← ADJUSTMENT ENTRY

FIG.10

| HASH VALUE | RELATIVE START TIME | RELATIVE END TIME |
|---|---|---|
| h1 | 00:00 | 00:10 |
| h2 | 00:10 | 00:20 |
| h3 | 00:20 | 00:30 |
| .. | .. | .. |
| hn | 02:50 | 03:00 |
| adj | 03:00 | 4:17 ← RELATIVE TIME WHEN TIME STAMP IS ACQUIRED | hlb

METHOD AND DEVICE FOR TIME VERIFYING MEASUREMENT DATA

BACKGROUND OF THE INVENTION

1. Field of the Invention

The present invention relates generally to measuring devices, measuring methods, measuring program products, measurement data editing devices, measurement data editing methods, measurement data editing program products, measurement time verifying devices, measurement time verifying methods, and measurement time verifying program products, and more particularly to a measuring device, a measuring method, a measuring program product, a measurement data editing device, a measurement data editing method, a measurement data editing program product, a measurement time verifying device, a measurement time verifying method, and a measurement time verifying program product regarding measurement data obtained by recording measurement information based on continuous measurements.

2. Description of the Related Art

Digital signing techniques and digital time-stamping techniques are employed for enhancing evidential credibility. Patent Document 1 discloses an example of a conventional technique for enhancing evidential credibility. That is, when a shutter button of a digital camera is pressed and image data are generated, position information acquired by GPS and time information is added to the image data as attribute information. Furthermore, an electronic signature is generated by using a secret key in the digital camera body, and the electronic signature is attached to the image data. Accordingly, the place and time of the photographed image data can be validated, and the image data can be used as an evidence photograph.

As popularity of digital equipment is increasing, more importance is being placed on providing evidential credibility to digital data generated by various measuring devices by attaching an electronic signature or a digital time stamp to the digital data (see, for example, Patent Document 2). It would also be convenient to be able to use digital video data recorded by a digital video camera as an evidence video.

Patent Document 1: Japanese Laid-Open Patent Application No. 2005-45486

Patent Document 2: U.S. Pat. No. 6,889,324

However, unlike photographs, video data have continuous and temporal elements. Therefore, the conventional techniques cannot be directly applied. For example, it is difficult to validate the recorded time of an arbitrary image recorded in video data. Furthermore, video data are often edited after being recorded to delete unnecessary scenes. When video data are edited, evidential credibility cannot be maintained because the electronic signature or the time stamp cannot be verified. The same problem arises not only for video data but also for any kind of data that are continuously measured with the passage of time, such as audio data.

SUMMARY OF THE INVENTION

The present invention provides a measuring device, a measuring method, a measuring program product, a measurement data editing device, a measurement data editing method, a measurement data editing program product, a measurement time verifying device, a measurement time verifying method, and a measurement time verifying program product in which one or more of the above-described disadvantages are eliminated.

A preferred embodiment of the present invention provides a measuring device, a measuring method, a measuring program product, a measurement data editing device, a measurement data editing method, a measurement data editing program product, a measurement time verifying device, a measurement time verifying method, and a measurement time verifying program product capable of appropriately proving measurement time of continuously measured measurement data.

An embodiment of the present invention provides a measuring device for generating measurement data recorded by continuously measuring measurement information, the measuring device including a data dividing unit configured to generate divided data items by dividing the measurement data in predetermined units; a feature quantity acquiring unit configured to acquire feature quantities each representing one of the divided data items generated by the data dividing unit; a time stamp acquiring unit configured to acquire a time stamp based on measurement time data, wherein the measurement time data include the feature quantities and measurement time identification information of each of the divided data items, the measurement time identification information expressing a measurement time of each of the divided data items on a predetermined time axis; a signature generating unit configured to generate an electronic signature for the measurement time data and the time stamp by using a private key specific to the measuring device; and a saving unit configured to save the measurement time data, the time stamp, and the electronic signature in association with the measurement data.

An embodiment of the present invention provides a measuring method performed in a measuring device for generating measurement data recorded by continuously measuring measurement information, the measuring method including the steps of (a) generating divided data items by dividing the measurement data in predetermined units; (b) acquiring feature quantities each representing one of the divided data items generated at step (a); (c) acquiring a time stamp based on measurement time data, wherein the measurement time data include the feature quantities and measurement time identification information of each of the divided data items, the measurement time identification information expressing a measurement time of each of the divided data items on a predetermined time axis; (d) generating an electronic signature for the measurement time data and the time stamp by using a private key specific to the measuring device; and (e) saving the measurement time data, the time stamp, and the electronic signature in association with the measurement data.

According to one embodiment of the present invention, a measuring device, a measuring method, a measuring program product, a measurement data editing device, a measurement data editing method, a measurement data editing program product, a measurement time verifying device, a measurement time verifying method, and a measurement time verifying program product capable of appropriately proving measurement time of continuously measured measurement data, are provided.

BRIEF DESCRIPTION OF THE DRAWINGS

Other objects, features and advantages of the present invention will become more apparent from the following detailed description when read in conjunction with the accompanying drawings, in which:

FIG. 8 is an example of the hash list with an adjustment entry added at the end;

FIG. 10 is an example of the hash list in which a value of the relative end time of the adjustment entry is updated;

DETAILED DESCRIPTION OF THE PREFERRED EMBODIMENTS

A description is given, with reference to the accompanying drawings, of an embodiment of the present invention.

First, a description is given of an operation of generating an evidence video according to an embodiment of the present invention. Video data or animated data are described as examples of measurement data obtained by recording continuously measured (recorded) measurement information (images). A digital video camera used for recording the video data is described as an example of a measurement device.

Figure 1:
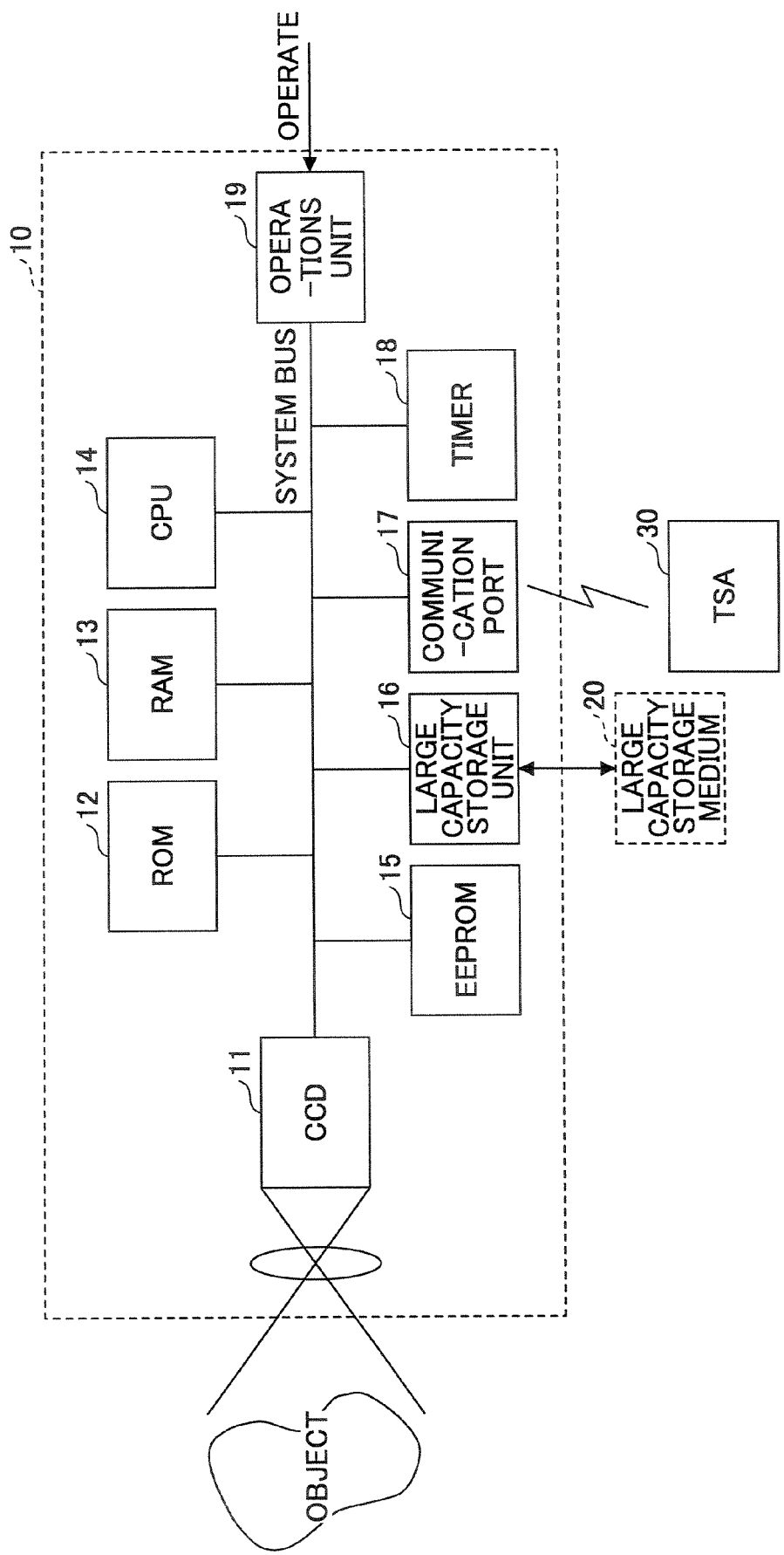
FIG. 1 is a block diagram of a hardware configuration of a digital video camera according to an embodiment of the present invention.

FIG. 1 is a block diagram of a hardware configuration of a digital video camera according to an embodiment of the present invention. As shown in FIG. 1, the digital video camera 10 includes a CCD 11, a ROM 12, a RAM 13, a CPU 14, an EEPROM 15, a large capacity storage unit 16, a communication port 17, a timer 18, and an operations unit 19.

The CCD 11 continuously records (measures) an image (physical quantity) located outside the digital video camera 10 along with the passage of time. The ROM 12 holds a program, etc., for generating and recording digital video data (hereinafter, "evidence video") whose recorded time (measurement time) can be validated. The RAM 13 is used as an execution memory space for executing the program loaded from the ROM 12. The CPU 14 executes the program loaded in the RAM 13 to control various functions of the digital video camera 10. The EEPROM 15 holds information that is not to be accessed from outside. In the present embodiment, various data (described below) necessary for validating the recorded time of the evidence video are loaded in the EEPROM 15.

The evidence video generated by the program is recorded in the large capacity storage unit 16. A large capacity storage medium 20 can be detachably inserted in the large capacity storage unit 16. Accordingly, the evidence video can be easily distributed by using the large capacity storage medium 20. The communication port 17 serves as a connection unit for communicating with the outside. For example, the communication port 17 is used for communicating with an external TSA (time stamping authority or time stamping service) 30. Furthermore, the recorded evidence video data can be distributed outside via the communication port 17. The timer 18 manages the time within the digital video camera 10. The operations unit 19 includes buttons for receiving operations instruction from a user.

Figure 2:
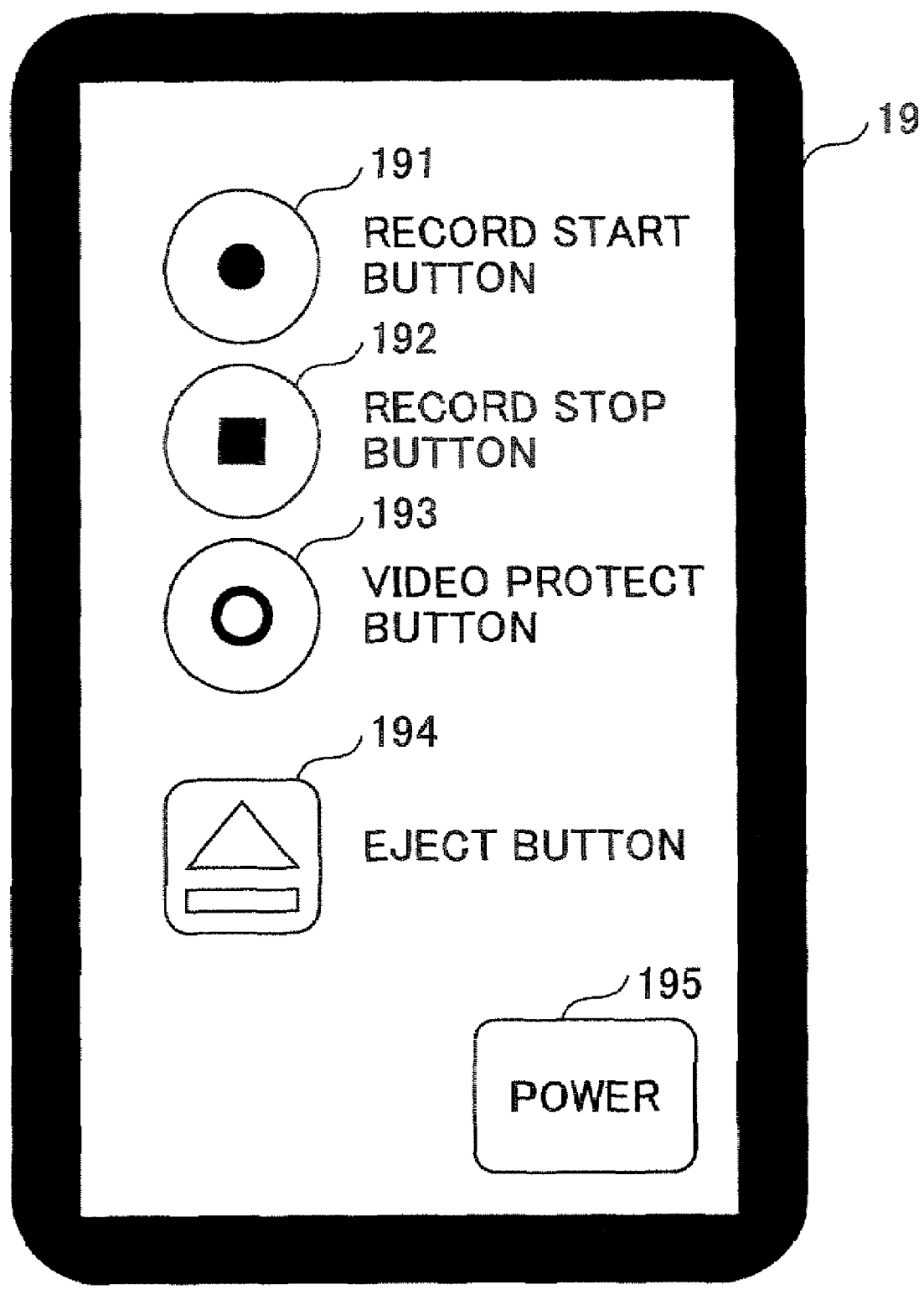
FIG. 2 is a schematic diagram of a configuration of an operations unit.

FIG. 2 is a schematic diagram of a configuration of the operations unit 19. As shown in FIG. 2, the operations unit 19 includes a record start button 191, a record stop button 192, a video protect button 193, an eject button 194, and a power button 195. Functions of the buttons are described below.

Figure 3:
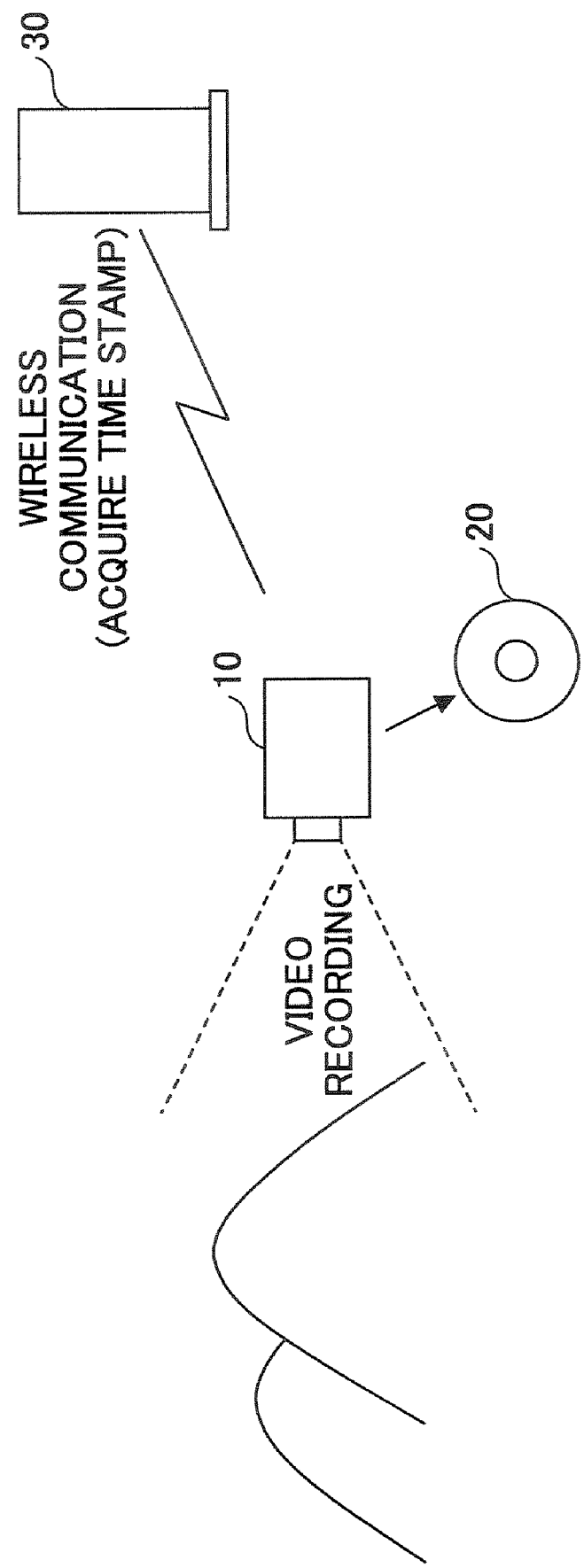
FIG. 3 is a schematic diagram illustrating how a video is recorded by the digital video camera according to the embodiment of the present invention.

FIG. 3 is a schematic diagram illustrating how a video is recorded by the digital video camera 10 according to the embodiment of the present invention.

When the record start button 191 is pressed, the digital video camera 10 starts video recording. When the record stop button 192 is pressed, the digital video camera 10 stops video recording. When video recording is completed, and the digital video camera 10 is in an environment where acquiring a time stamp for validating the time is possible, i.e., in an environment where communicating with the TSA 30 is possible, the digital video camera 10 acquires a time stamp from the TSA 30 by wireless communication, and generates an evidence video.

When the digital video camera 10 is not in an environment where communicating with the TSA 30 is possible, the recorded video data are loaded in the large capacity storage unit 16. When the digital video camera 10 comes into an environment where communicating with the TSA 30 is possible, the user presses the video protect button 193. Accordingly, the digital video camera 10 acquires a time stamp from the TSA 30, and generates an evidence video.

The generated evidence video is loaded in the large capacity storage unit 16. When the user presses the eject button 194, the large capacity storage medium 20 is ejected from the large capacity storage unit 16. It is also possible to send out the evidence video as evidence data via a network.

In order to generate an evidence video with the program, a private key (secret key) specific to the digital video camera 10 and a public key certificate corresponding to the private key are installed in the digital video camera 10 in advance.

Figure 4:
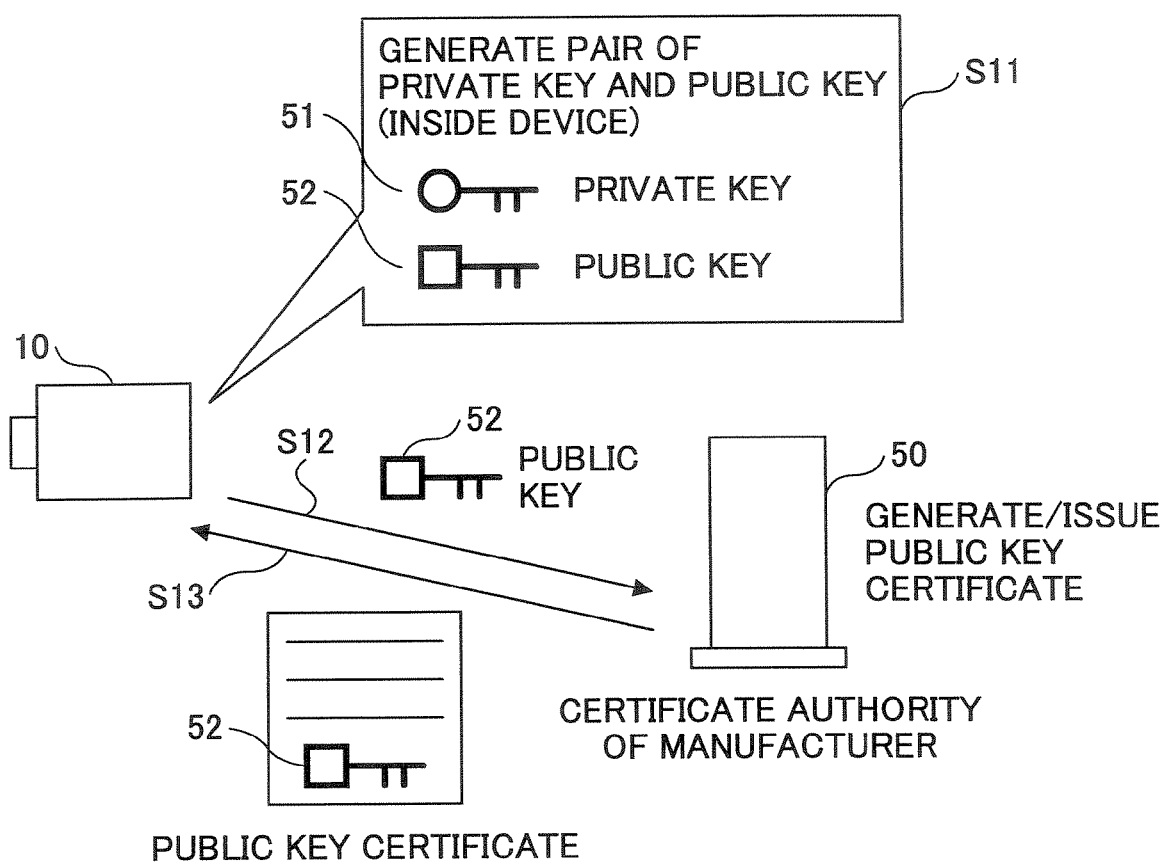
FIG. 4 is a diagram illustrating how a private key specific to the digital video camera and a public key certificate are installed.

FIG. 4 is a diagram illustrating how the private key specific to the digital video camera 10 and the public key certificate are installed.

Inside the digital video camera 10, the CPU executes the program loaded in the ROM 12 to generate a private key 51 specific to the digital video camera 10 and a public key 52 corresponding to the private key 51 (step S11). The public key 52 is sent to a certificate authority 50 of the manufacturer of the digital video camera 10 (step S12), a public key certificate cert for the private key 51 is issued by the certificate authority 50 (step S13), and the public key certificate cert is installed in the digital video camera 10. The private key 51 and the public key certificate cert are preferably loaded in the EEPROM 15 so as not to be accessed from the outside.

This installation process can be performed before factory shipment of the digital video camera 10. The private key 51 and the public key certificate cert can be renewed after factory shipment.

Figure 5:
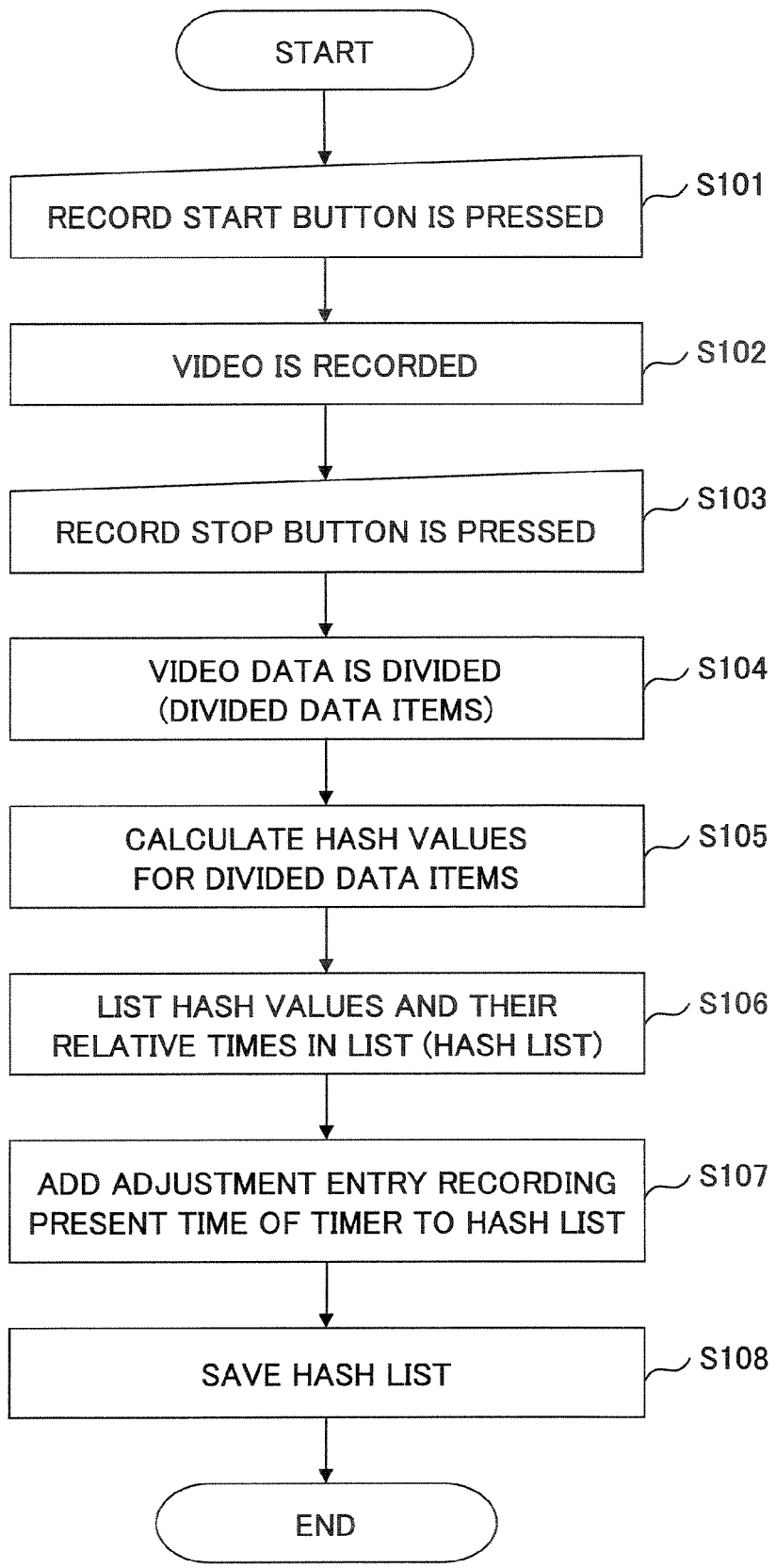
FIG. 5 is a flowchart of a process for recording a video performed by the digital video camera according to the embodiment of the present invention.

A process performed by the digital video camera 10 is described below. FIG. 5 is a flowchart of the process for recording a video performed by the digital video camera 10 according to the embodiment of the present invention. Processes described with reference to FIG. 5 and onward are controlled by the CPU 14 according to the program loaded in the RAM 13 from the ROM 12.

When a user presses the record start button 191 (step S101), images acquired by the CCD 11 are sequentially recorded as video data (motion data) in the large capacity storage medium 20 inserted in the large capacity storage unit 16 (step S102). When the user presses the record stop button 192, recording of video data is stopped (step S103). When the recording stops, the digital video camera 10 automatically executes the steps from step S104 onward.

First, video data recorded in the large capacity storage medium 20 are divided in units that can be easily edited later (step S104), and a hash value is calculated for each divided data item by using a hash algorithm (step S105). The hash algorithm is preferably an adequately safe algorithm for guaranteeing evidential credibility, such as SHA-1 or SHA-256.

Figure 6:
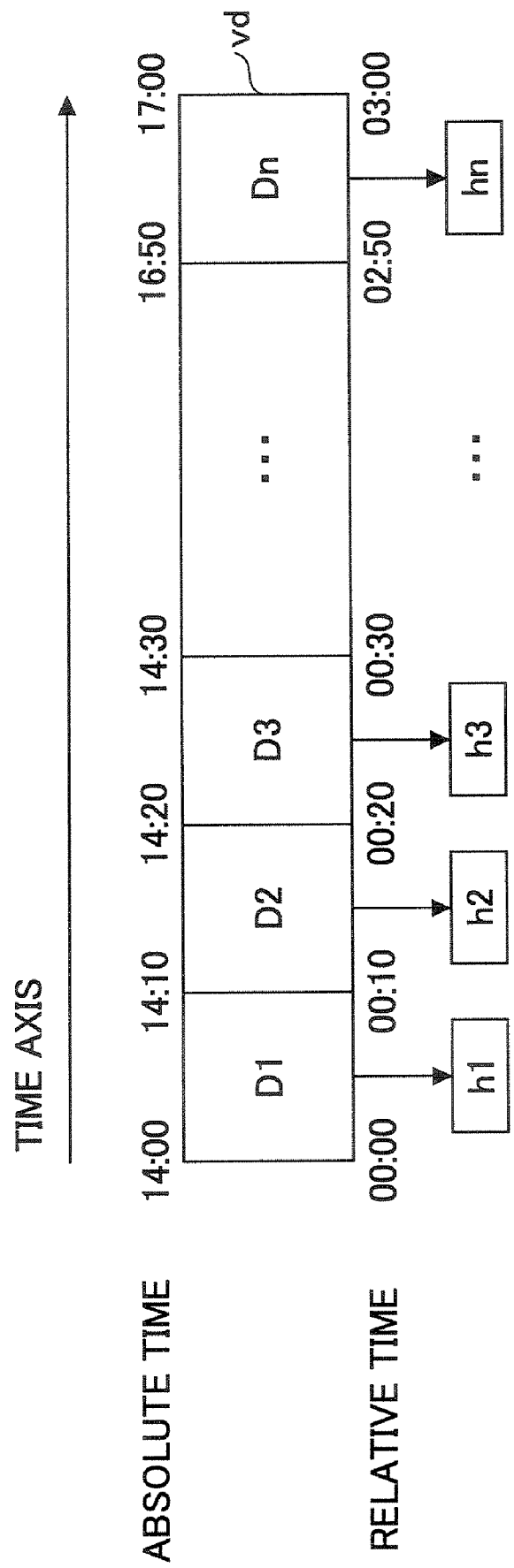
FIG. 6 is a conceptual diagram illustrating operations of dividing video data and calculating a hash value.

FIG. 6 is a conceptual diagram illustrating operations of dividing video data and calculating the hash value. As shown in FIG. 6, video data vd are divided into divided data items D1-Dn. Hash values h1-hn are calculated for the divided data items D1-Dn, respectively. An absolute time indicated in FIG. 6 is the actual time. Accordingly, the images recorded in the video data vd were recorded at 14:00-17:00. A relative time indicated in FIG. 6 is a relative time from a certain time point on a predetermined time axis. In the present embodiment, the relative time corresponds to the time that has passed from when recording started on a time axis according to the timer 18 in the digital video camera 10.

In the example shown in FIG. 6, the video data vd are divided in units of ten minutes as a matter of convenience. The units of division can be based on a predetermined code in the video data. For example, if the data are formatted in MPEG 4, the video data are preferably divided in units of I frames including complete image data, instead of P frames or B frames corresponding to differential data. The units of division are at least capable of being reproduced in other devices. To guarantee the reproduction in other devices, a predetermined code can be embedded in the video data vd for indicating where the data are to be divided.

Next, a list (hereinafter, "hash list") is generated, including entries of hash values calculated based on the divided data item, and relative start times and relative end times of the divided data item corresponding to the hash values (step S106).

Figure 7:
FIG. 7 is an example of a hash list.

FIG. 7 is an example of the hash list. As shown in FIG. 7, each entry of a hash list hl includes a hash value, and a relative start time and a relative end time of a divided data item corresponding to the hash value. For example, for hash value h2, the relative start time (00:10) and the relative end time (00:20) of the corresponding divided data item D2 are recorded.

In this example of the present embodiment, only information regarding time is recorded as a matter of convenience. In reality, date information is also recorded. Furthermore, information indicating the time difference between a reference time can also be recorded.

Next, an entry for adjustment is added at the end of the hash list (step S107). The entry for adjustment (hereinafter, "adjustment entry") includes the last relative end time and the present time indicated by the timer 18 (i.e., the time indicated by the timer 18 when video recording ends).

FIG. 8 is an example of the hash list with an adjustment entry added at the end. A hash list hla shown in FIG. 8 has an adjustment entry adj added. The adjustment entry adj includes the last relative end time ("03:00" in the example shown in FIG. 8) and the time indicated by the timer 18 when video recording ended ("17:00" in the example shown in FIG. 8).

Next, the hash list hla is saved in the EEPROM 15 (step S108). Steps performed for ending video recording are thus completed.

As a result of the process shown in FIG. 5, in the digital video camera 10, the video data vd are saved in the large capacity storage medium 20, and the hash list hla based on the video data vd are saved in the EEPROM 15.

Figure 9:
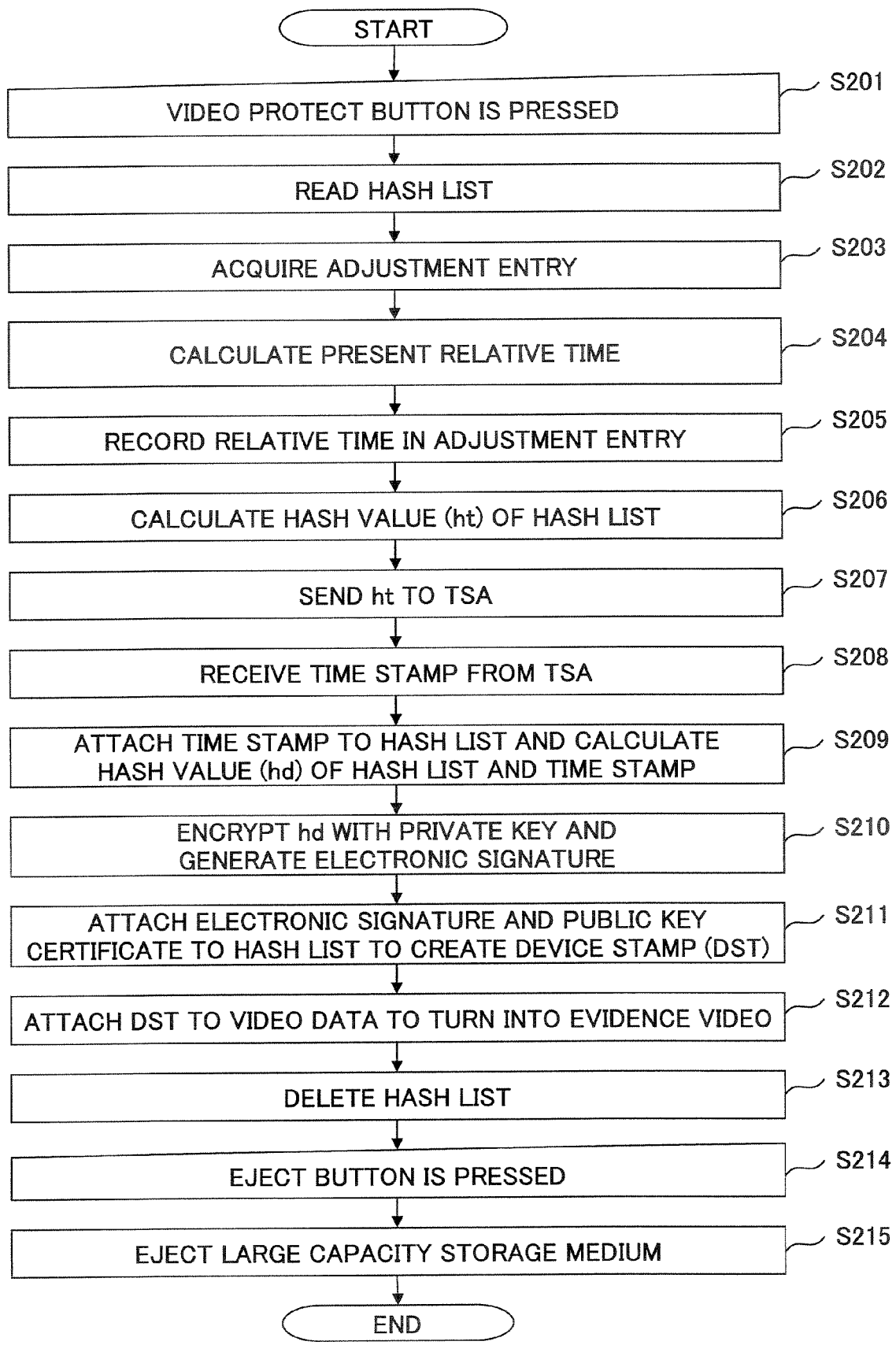
FIG. 9 is a flowchart of a process for generating an evidence video.

Next, a process of turning the video data vd into an evidence video is described. FIG. 9 is a flowchart of the process for generating an evidence video. The process shown in FIG. 9 needs to be executed when the digital video camera 10 is in an environment where communicating with the TSA 30 is possible.

For example, when a user presses the video protect button 193 (step S201), the hash list hla is read from the EEPROM 15 and is loaded into the RAM 13 (step S202), and the adjustment entry adj is acquired (step S203). When the hash list hla cannot be read, an error is indicated, and the process shown in FIG. 9 ends.

The present time indicated by the timer 18 (e.g., 18:17) is acquired. A present relative time (relative time from when video recording started) is calculated based on the time difference between the acquired present time and the relative end time indicated by the adjustment entry adj (step S204). The value of the relative end time of the adjustment entry adj is updated by the calculated value (step S205). Specifically, referring to FIG. 8, when the present time indicated by the timer 18 is 18:17, the time difference between the relative end time (17:00) in the adjustment entry adj is 1 hour and 17 minutes. This value is added to the relative start time (3:00) in the adjustment entry adj, and as a result, a value 4:17 is obtained as the present relative end time. Accordingly, the relative end time of the adjustment entry adj is replaced with 4:17.

FIG. 10 is an example of the hash list with the updated relative end time in the adjustment entry. The value of the relative end time in the adjustment entry adj in a hash list hlb shown in FIG. 10 is replaced with 4:17. The value of the relative end time of the adjustment entry adj serves as information for indicating the relative relationship between a time stamp to be acquired later.

A hash value ht representing the hash list hlb is calculated (step S206), and the hash value ht is sent to the TSA 30 via the communication port 17 in order to request a time stamp TST for the hash value ht from the TSA 30 (step S207). The time stamp TST is received from the TSA 30 (step S208). A time stamp protocol prescribed by the RFC3161 can be used for acquiring the time stamp TST from the TSA 30. The time stamp TST can validate the time of forming the hash list hlb, i.e., the time of recording the video data vd.

Next, the acquired time stamp TST is attached to the hash list hlb, and a hash value hd corresponding to data obtained by combining the hash list hlb and the time stamp TST is calculated (step S209). The private key 51 secretly held in the EEPROM 15 is used to encrypt the hash value hd, thereby generating an electronic signature sign (step S210). The electronic signature sign can validate that the hash list hlb, the video data vd, and the time stamp TST have not been falsified.

Next, a public key certificate cert corresponding to the private key 51 is read from the EEPROM 15. A combination of the read public key certificate cert, the hash list hlb, and the time stamp TST configures data for validating the recording time of the video data vd (hereinafter, "device stamp DST") (step S211). The device stamp DST is loaded in the large capacity storage medium 20 in association with the video data vd (step S212). By being associated with the device stamp DST, the video data vd are turned into an evidence video. The video data vd associated with the device stamp DST correspond to an evidence video. The device stamp DST does not need to be joined with the video data vd. The device stamp DST and the video data vd can be managed as separate data units.

The hash list hlb is deleted from the EEPROM 15 (step S213). The hash list hlb is deleted so that when a different large capacity storage medium 20 is inserted, the hash list hlb is prevented from being erroneously used to generate a device stamp DST for different video data.

When the eject button 194 is pressed (step S214), the digital video camera 10 ejects the large capacity storage medium 20 holding the evidence video (step S215). Instead of ejecting the large capacity storage medium 20, the evidence video data can be transmitted outside via the communication port 17.

Figure 11:
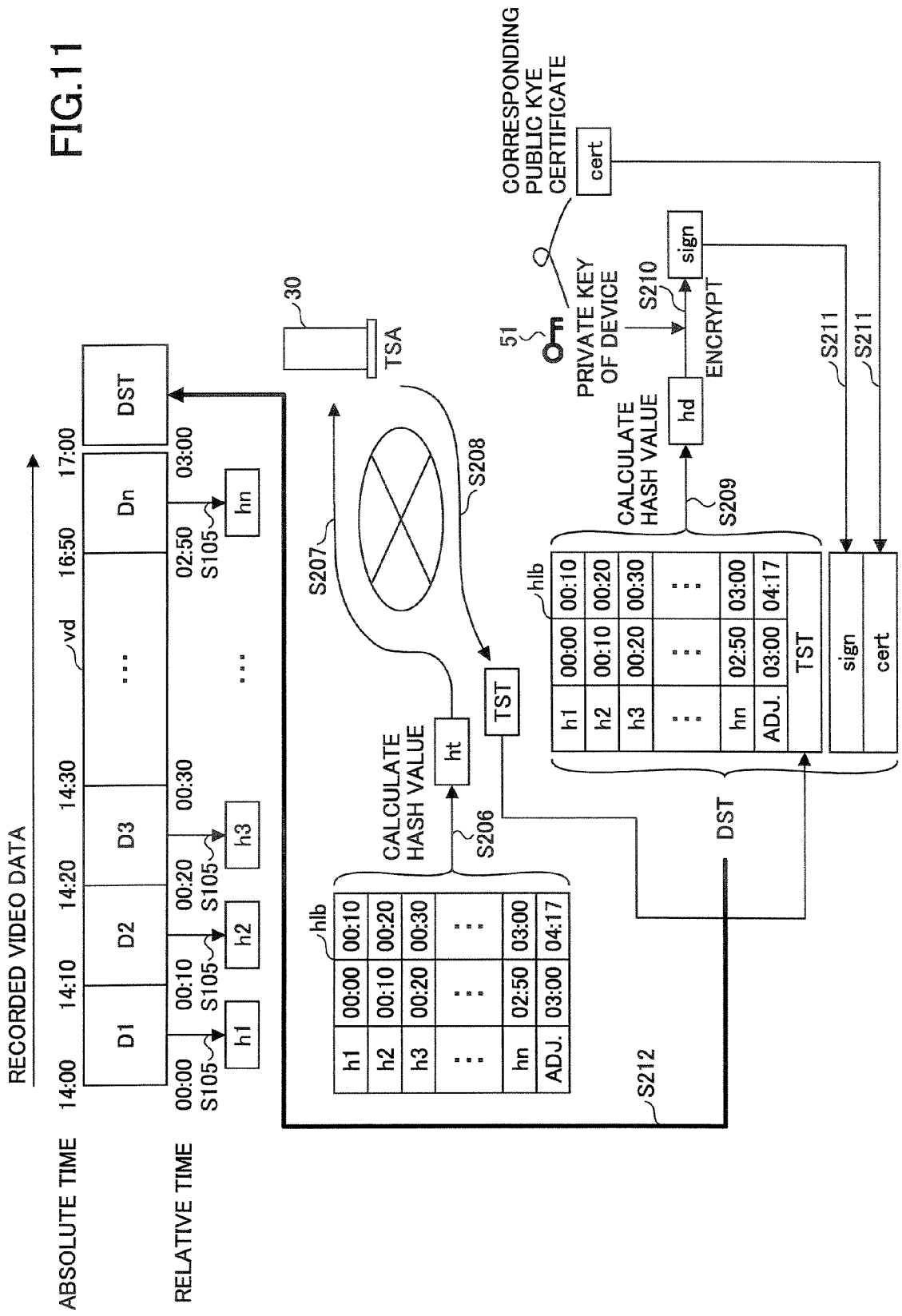
FIG. 11 is a conceptual diagram of the processes of generating and attaching a device stamp for video data.

An overview of relevant elements of the above-described processes is described with reference to FIG. 11. FIG. 11 is a conceptual diagram of the processes of generating a device stamp and attaching it to video data. The step numbers shown in FIG. 11 correspond to those shown in FIG. 5 or FIG. 9.

The hash values h1-hn are generated for the divided data items D1-Dn, respectively, obtained by dividing the video data vd (step S105). The hash list hlb is generated based on the hash values h1-hn.

The hash value ht for the hash list hlb is calculated (step S206), and the hash value ht is sent to the TSA 30 (step S207). The TSA 30 generates the time stamp TST based on the hash value ht, and sends the time stamp TST to the digital video camera 10 (step S208).

The hash value hd representing the time stamp TST combined with/attached to the hash list hlb is calculated (step S209). By encrypting the hash value hd with the private key 51, the electronic signature sign is generated (step S210).

Next, the device stamp DST is generated by attaching the time stamp TST, the electronic signature sign, and the public key certificate cert to the hash list hlb (step S211). The evidence video is generated by associating the device stamp DST with the video data vd (step S212).

Figure 12:
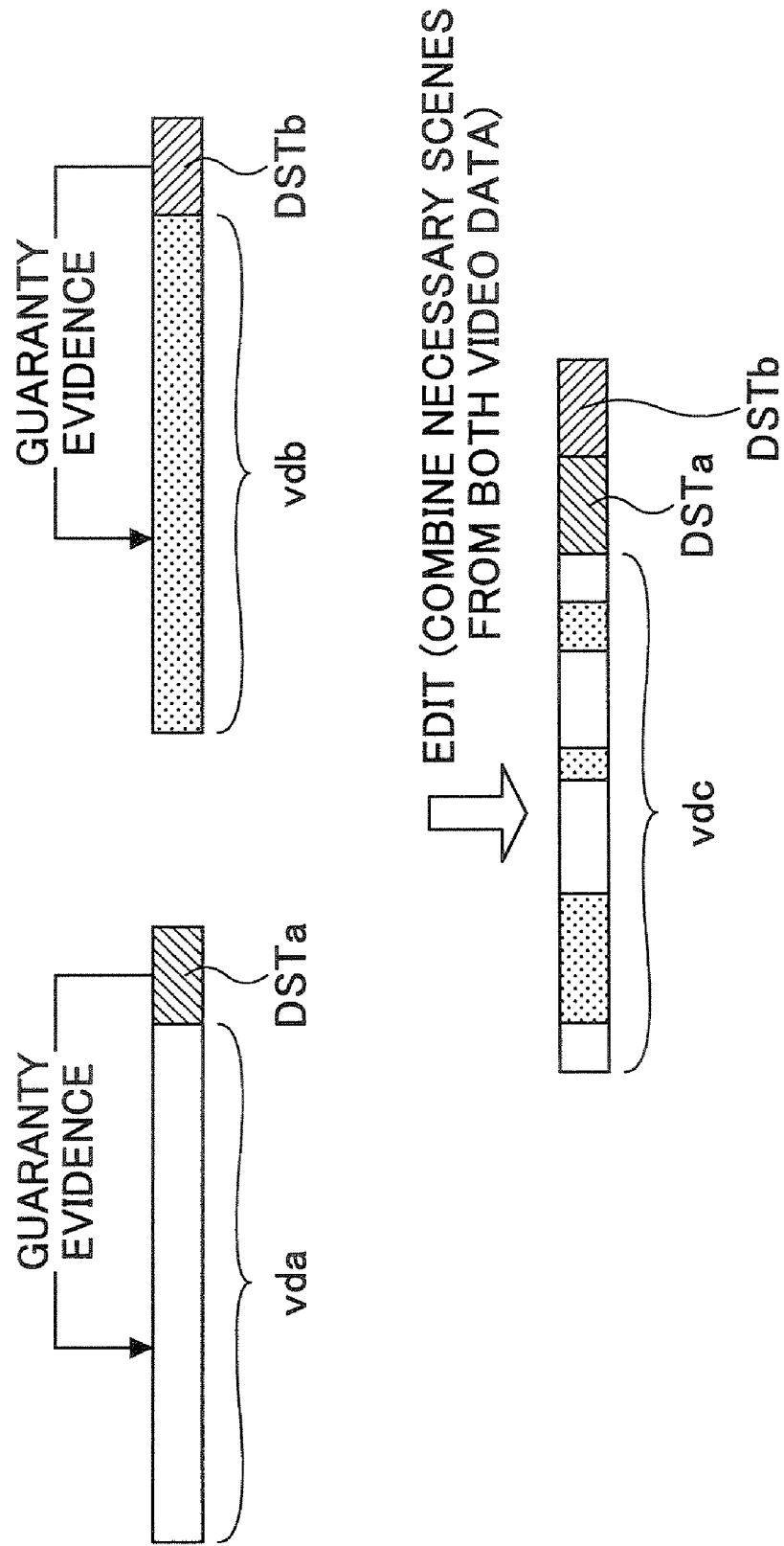
FIG. 12 is a diagram for describing an editing method of evidence videos.

Next, a description is given of an editing method performed for extracting necessary scenes from plural evidence videos, generating new video data with the extracted scenes, and turning the new video data into an evidence video. FIG. 12 is a diagram for describing the editing method of evidence videos.

In order to turn the new video data into an evidence video, which new video data are generated by extracting necessary scenes from one or more evidence videos (source videos), the device stamps attached to the source evidence videos are directly attached to the new video data.

In the example shown in FIG. 12, necessary scenes are extracted from video data vda that have attached a device stamp DSTa and video data vdb that have attached a device stamp DSTb. The extracted scenes are combined together to generate video data vdc. The device stamp DSTa and the device stamp DSTb are attached to the newly generated video data vdc, so that the video data vdc are turned into an evidence video. The video data are to be edited in units by which video data are divided in step S104 in FIG. 5. When necessary scenes are extracted only from the video data vda to generate a new evidence video, the device stamp DSTa attached to the video data vda is to be attached to the new evidence video.

Figure 13:
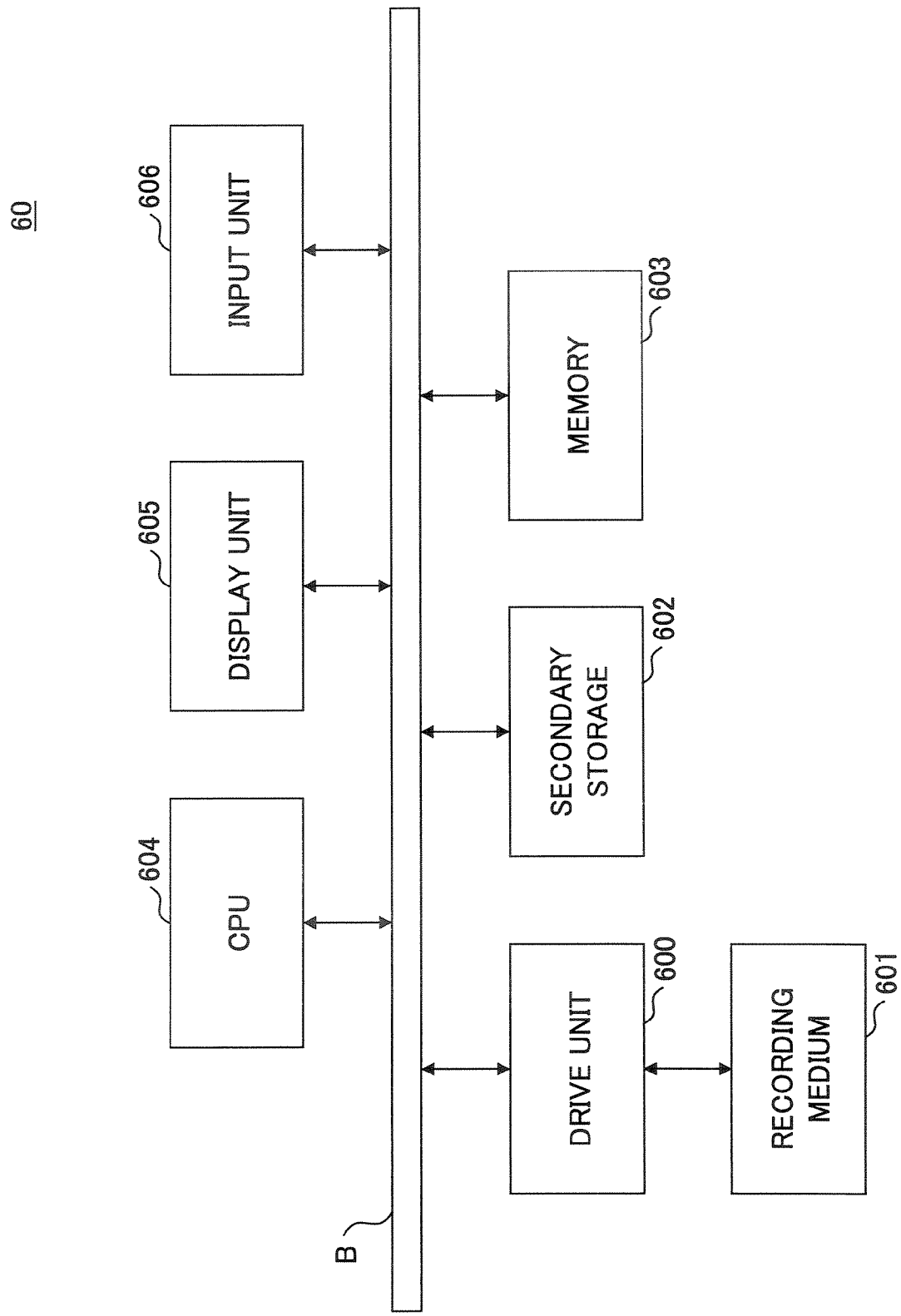
FIG. 13 is a block diagram of a hardware configuration of an evidence video editing device according to an embodiment of the present invention.

The above-described editing method can be realized by a typical computer as described below. FIG. 13 is a block diagram of a hardware configuration of an evidence video editing device according to an embodiment of the present invention.

An evidence video editing device 60 shown in FIG. 13 includes a drive unit 600, a secondary storage 602, a memory 603, a CPU 604, a display unit 605, and an input unit 606, which are interconnected by a bus B.

A program for realizing a process performed by the evidence video editing device 60 is provided by a recording medium 601 such as a CD-ROM. When the recording medium 601 including the program is inserted in the drive device 600, the program is installed in the secondary storage 602 from the recording medium 601 via the drive unit 600. Various data necessary for executing the program are loaded in the secondary storage 602, together with the installed program.

When an instruction to start up the program is received, the program is loaded into the memory 603 from the secondary storage 602. The CPU 604 executes functions relative to the evidence video editing device 60 according to the program loaded in the memory 603. The display unit 605 displays a GUI (Graphical User Interface) according to the program. The input unit 606 includes a keyboard and a mouse, and is used to input various instructions.

The program installed in the evidence video editing device 60 shown in FIG. 13 causes the evidence video editing device 60 to execute a process for editing an evidence video. The basic concept is the same as that described with reference to FIG. 12.

Figure 14:
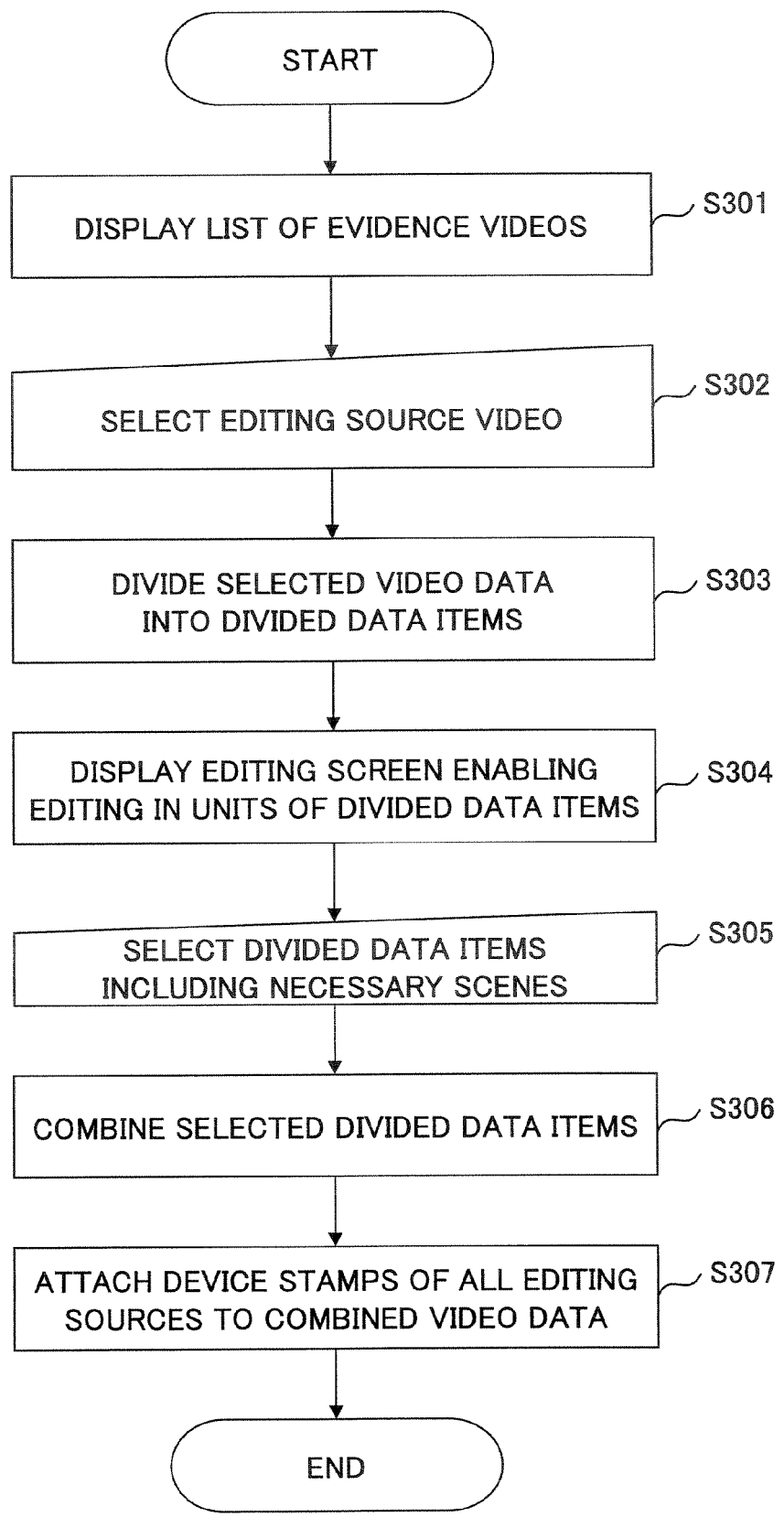
FIG. 14 is a flowchart of a process for editing an evidence video performed by the evidence video editing device according to the embodiment of the present invention.

FIG. 14 is a flowchart of the process for editing an evidence video performed by the evidence video editing device 60 according to the embodiment of the present invention.

When an instruction to edit an evidence video is received from a user, the display unit 605 displays a list of evidence videos managed by the secondary storage 602 or a predetermined file server connected via a network (step S301). A user selects one or more evidence videos to be edited (source videos) from the list (step S302). Video data of each selected evidence video are divided into divided data items (step S303). A list of the selected evidence videos is displayed in a format such that editing can be performed in units of the divided data items (step S304). For example, each evidence video can be displayed as a rectangle as shown in FIG. 6, so that selections can be made in units of divided data items included in the rectangle.

A user selects divided data items including necessary scenes (step S305). Plural divided data items can be selected from plural evidence videos. When selection of the divided data items is completed, and an instruction to generate new evidence data is received, the selected divided data items are combined to generate new video data (steps S306). Device stamps DST attached to the evidence videos (source videos) from which the divided data are selected are attached to the newly generated evidence data. Accordingly, the new evidence data become an evidence video. The new evidence video is loaded in the secondary storage 602 or a predetermined file server connected via a network (step S307).

Next, a description is given of verification of an evidence video (proving the recorded time). The hardware configuration of a device for verifying an evidence video (evidence video verifying device) can be the same as that shown in FIG. 13, and therefore, the description thereof is omitted. An evidence video verifying process can be realized by a program installed in the evidence video verifying device. The evidence video verifying device can be not only a general-purpose computer but also a video data reproducing device.

Figure 15:
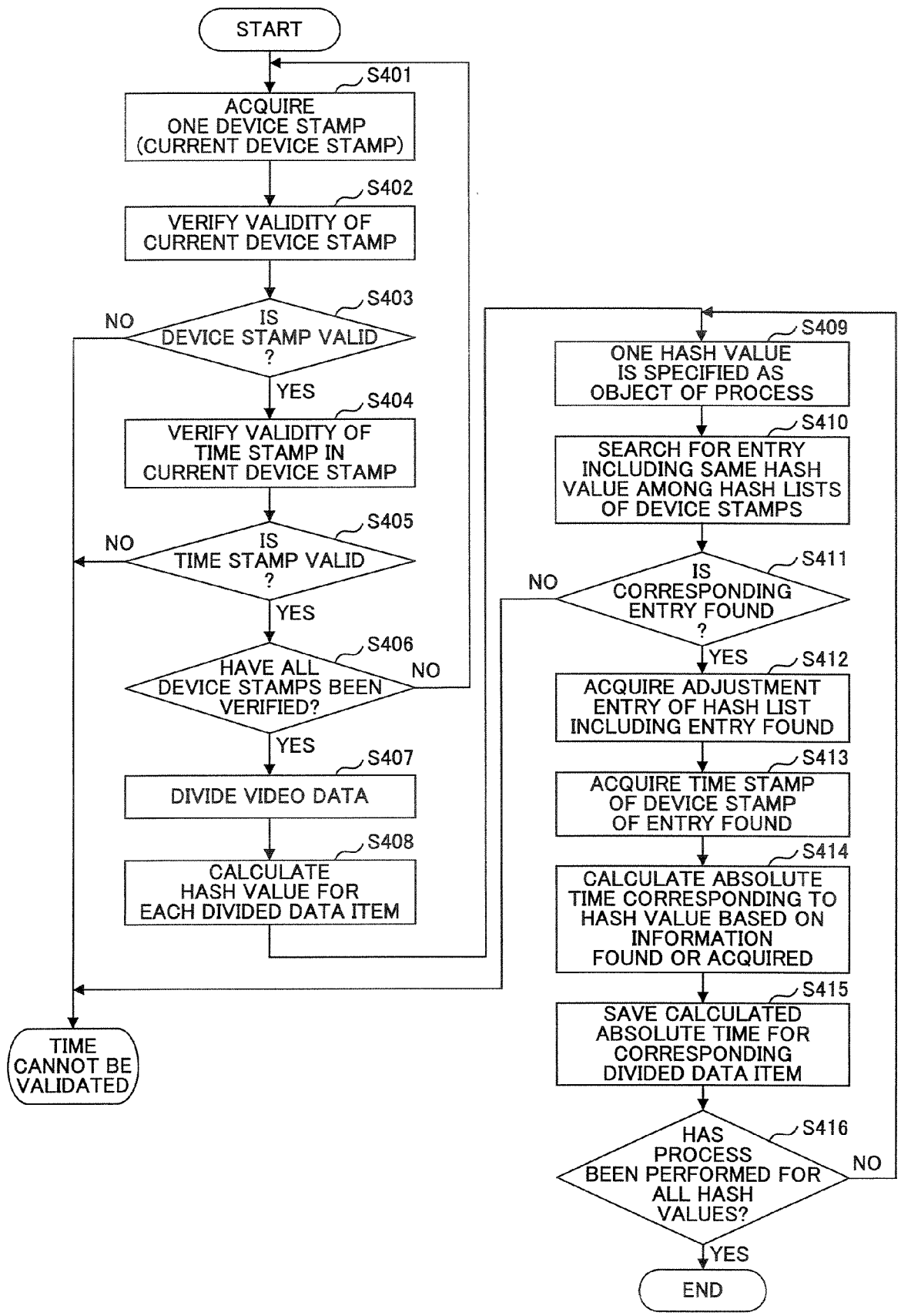
FIG. 15 is a flowchart of an evidence video verifying process performed by an evidence video verifying device.
Figure 16:
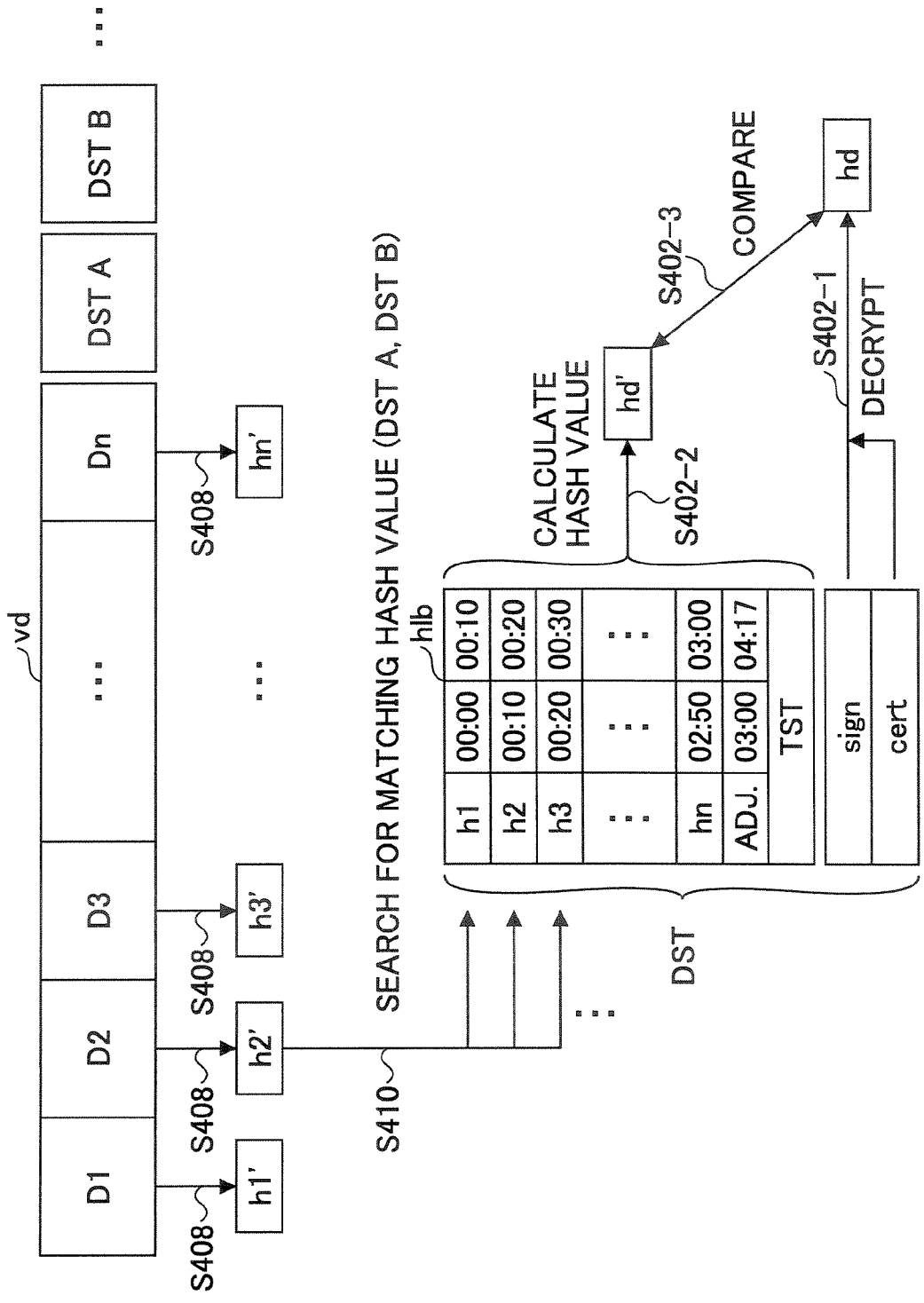
FIG. 16 is a conceptual diagram of the evidence video verifying process.

The process performed by the evidence video verifying device is described with reference to FIGS. 15 and 16. FIG. 15 is a flowchart of the evidence video verifying process performed by the evidence video verifying device. FIG. 16 is a conceptual diagram of the evidence video verifying process.

First, the evidence video verifying device extracts a device stamp DST attached to an evidence video, which is an object of verification (step S401). The extracted device stamp DST is hereinafter referred to as a "current device stamp DST". The validity (not falsified) of the current device stamp DST is verified (step S402).

Details of this step are described with reference to FIG. 16. A public key included in a public key certificate cert is used to decrypt an electronic signature sign of the current device stamp DST, thereby obtaining a hash value hd (step S402-1). Next, the evidence video verifying device calculates a hash value for data including the hash list hlb and the time stamp TST of the current device stamp DST, to obtain a hash value hd' (step S402-2). When the hash value hd and the hash value hd' match upon comparison, the current device stamp DST is determined as being valid (step S402-3).

When the current device stamp DST is determined as being invalid (No in step S403 in FIG. 15), the current device stamp DST may have been falsified. Accordingly, it is determined that the time of the evidence video cannot be validated, and the process ends. When the current device stamp DST is determined as being valid (Yes in step S403), the validity of the time stamp TST in the current device stamp DST is verified (step S404). The verification process is performed according to the time stamping method of the time stamp TST. For example, when the time stamp TST is based on the PKI (Public Key Infrastructure) method, the same process as that for verifying the electronic signature sign can be performed.

When the time stamp TST is determined as being invalid (No in step S405), it is determined that the time of the evidence video cannot be validated, and the process ends. Conversely, when the time stamp TST is determined as being valid (Yes in step S405), verification of the current device stamp DST is completed.

When verification is completed for all current device stamps DST attached to the evidence video, which video is the object of verification (Yes in step S406), the video data vd of the evidence video are divided in the same units as when the video was recorded (step S407), and a hash value is calculated for each divided data item (step S408).

In the example shown in FIG. 16, the video data vd are divided into divided data items D1-Dn, and hash values h1'-hn' are calculated for the corresponding divided data items.

Next, steps S409-S415 are executed for each of the calculated hash values.

Hash values are specified as an object of the process, one at a time in sequential order (step S409). Among the hash lists hlb included in all device stamps DST attached to the evidence video that is the object of verification, an entry including a hash value that matches the hash value specified as the object of the process (hereinafter, "current hash value") is searched for (step S410). In the example shown in FIG. 16, a hash value h2' is searched for.

When an entry including a matching hash value is not found (No in step S411), the video data vd may have been falsified. Accordingly, it is determined that the time of the evidence video cannot be validated, and the process ends. Conversely, when an entry including a matching hash value is found, the adjustment entry adj is acquired from the hash list hlb to which the searched entry belongs (step S412). Further, the time stamp TST is acquired from the device stamp DST to which the searched entry belongs (step S413).

Next, the absolute time for the current hash value is calculated based on relative time information (relative start time, relative end time) of the searched entry, information included in the acquired adjustment entry adj, and time (absolute time) recorded in the acquired time stamp TST and validated by the TSA 30 (step S414). The calculated absolute time is saved as evidence time of the divided data item corresponding to the current hash value (step S415).

Specifically, the evidence time can be calculated as follows.

A hash value hk corresponds to a divided data item Dk.

It is assumed that a hash value hj included in a device stamp DSTm matches the hash value hk.

The relative start time and the relative end time of the hash value hj are tsj, tej, respectively.

The relative start time and the relative end time of the adjustment entry adj of the device stamp DSTm are tsa, tea, respectively.

The absolute time included in the device stamp DSTm and validated by the time stamp TST is tt.

The relative end time tea of the adjustment entry adj is the time at which the time stamp TST is acquired, i.e., the relative time corresponding to the absolute time recorded in the time stamp TST. Therefore, an evidence start time tsk and an evidence end time tek of the divided data item Dk are calculated by the following equations.

$$tsk = tt - (tea - tsj)$$

$$tek = tt - (tea - tej)$$

When the divided data item corresponds to a relatively long time (e.g., 10 minutes), the evidence time can be calculated by assuming that tsk and tek have linearly passed between the start and the end of the divided data item.

When the steps from step S409 onward are completed for all hash values (Yes in step S416), verification of the evidence video is completed. The evidence times (evidence start time and evidence end time) of the divided data items of the evidence video that is the object of verification are saved in association with the corresponding divided data items.

Accordingly, it is validated that none of the hash list hlb, the time stamp TST, or the video data vd are falsified. Therefore, the calculated absolute time is considered as being highly reliable as an evidence time.

When reproducing the evidence video, it is possible to combine the evidence time with the evidence video so as to be displayed on a screen, indicating that the recorded time of the evidence video has been verified as being valid.

Figure 17:
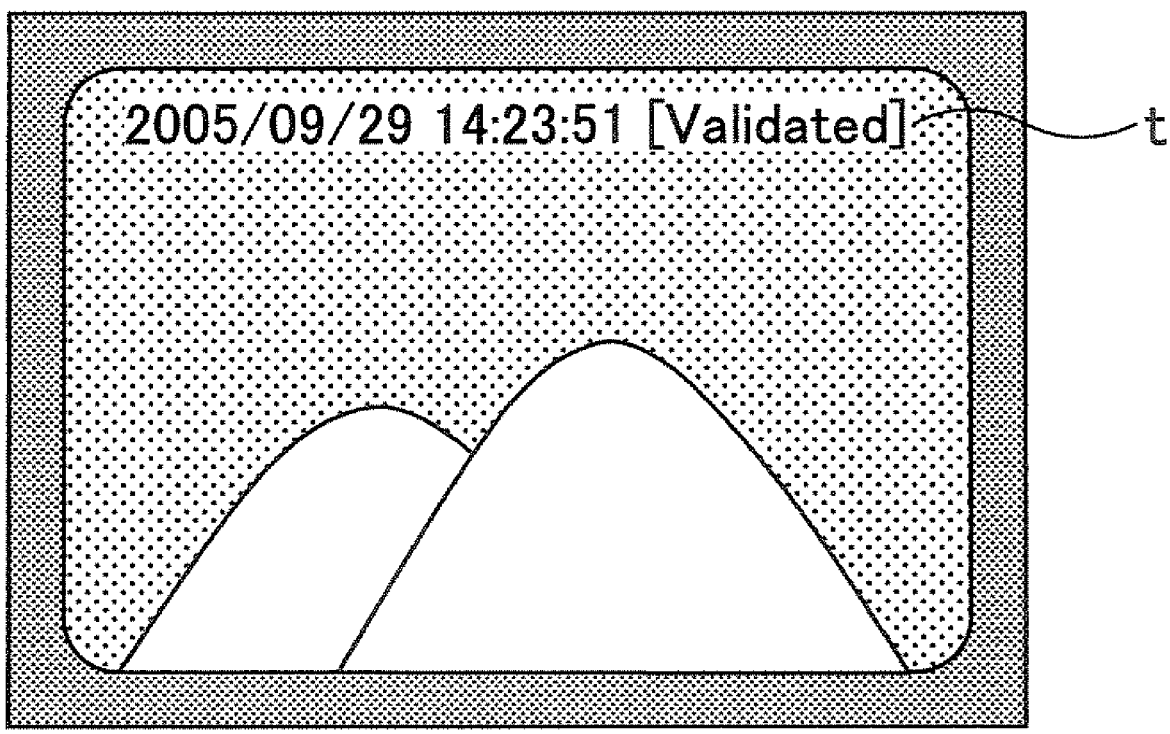
FIG. 17 is an example screen of a reproduced evidence video.

FIG. 17 is an example screen of a reproduced evidence video. In FIG. 17, an evidence time t is combined and displayed with a video being reproduced. It is possible to display a denotation indicating that the time is a validated evidence time ([Validated] in FIG. 17), so that it is clear to the viewer that the time is an evidence time.

As described above, the digital video camera 10 according to an embodiment of the present invention can generate video data that have attached a device stamp DST validating the absolute time at which the video is recorded. Even when a time stamp TST cannot be acquired when the recording ends, it is possible to hold in an adjustment entry adj the relationship between the time recorded in the time stamp TST and a relative time recorded by the timer 18. Therefore, the time of recording the evidence video can easily be back-calculated based on an absolute time recorded in the time stamp TST and a relative end time in the adjustment entry adj. However, when it is ensured that a time stamp TST can be immediately acquired when the recording ends, there is no need for an adjustment entry adj. This is because the relative end time of the last entry in the hash list hl corresponds to the absolute time recorded in the time stamp TST. In this case, as soon as the video recording ends, without waiting for the video protect button 193 to be pressed, a time stamp TST is automatically acquired and a device stamp DST is generated.

Furthermore, the digital video camera 10 divides video data vd by predetermined units, and each divided data item is associated with a relative start time and a relative end time. Accordingly, even when the video data vd are edited by extracting/adding a scene, if the editing is done in units of the divided data items, new evidence data can be easily generated by the editing process described with reference to FIG. 12.

When video recording is given a pause and is then resumed, the relative time may be deviated. This deviation can be adjusted by providing an adjustment entry for a pause in the hash list (i.e., record the pause start time in the relative start time field and the pause end time in relative end time field).

The evidence video editing device 60 according to an embodiment of the present invention can easily generate a new evidence video by attaching device stamps, which are attached to all of the source videos (or a single source video) used for editing, to the new video data to be generated.

The evidence video verifying device according to an embodiment of the present invention verifies the validity of a device stamp DST attached to an evidence video, and calculates the absolute time of recording the evidence video based on a relative time included in the device stamp DST and an absolute time recorded in the time stamp TST. Therefore, a highly reliable evidence time can be calculated.

In an embodiment of the present invention, hash values are calculated for each divided data item, and relative times are associated with each of the hash values. However, what is essential is that the divided data items and the relative times be associated with each other; the hash value merely serves as a medium for associating the divided data items and the relative times. Accordingly, as long as features of the divided data items can be indicated (i.e., the feature quantity of the divided data), any other type of information can be used instead of the hash values. However, hash values are preferable in terms of the data amount and security.

In an embodiment of the present invention, relative times are recorded in the hash list. However, any other form of information identifying relative times can be used. For example, when the division unit is fixed (e.g., by ten minutes), a simple serial number can be associated with each hash value.

Furthermore, in an embodiment according to the present invention, video data are described as an example of continuously measured data. However, the present invention can be effectively applied to any type of information other than video data, such as audio data or information measured with a thermometer or a voltmeter. The present invention can be used for validating the time at which information is measured with medical equipment (e.g., data obtained by recording images of internal organs). The present invention can be effectively applied to any kind of information that is digital data having continuous and temporal elements.

If measurement of the relative time is affected by setting a time in the timer 18, the digital video camera 10 can be configured such that a device stamp is not to be generated in a case where a time is set in the timer 18 while a video is being recorded or during a period from when video recording ends to when a time stamp TST is acquired. Accordingly, the evidence video can be prevented from being misused.

The present invention is not limited to the specifically disclosed embodiment, and variations and modifications may be made without departing from the scope of the present invention.

The present application is based on Japanese Priority Patent Application No. 2006-019450, filed on Jan. 27, 2006, the entire contents of which are hereby incorporated by reference.

What is claimed is:

1. A measuring device for generating measurement data by continuously recording measurement information, the measuring device comprising:
   a data dividing unit configured to generate divided data items by dividing the measurement data into predetermined units, after the generating the measurement data by continuously recording the measurement information is completed;
   a feature quantity acquiring unit configured to acquire feature quantities, each of the feature quantities identifying one of the divided data items generated by the data dividing unit;
   a time stamp acquiring unit configured to acquire a time stamp based on measurement time data, the measurement time data including the feature quantities and measurement time identification information of each of the divided data items, and the measurement time identification information defining a measurement time of each of the divided data items on a predetermined time axis;
   a signature generating unit configured to generate an electronic signature for the measurement time data and the time stamp by encrypting, using a private key specific to the measuring device, a hash value, wherein the hash value is calculated from the time stamp and a hash list including the feature quantities and corresponding relative start and end times; and
   a saving unit configured to save the measurement time data, the time stamp, and the electronic signature in association with the measurement data.

2. The measuring device according to claim 1, wherein the measurement time data include relative information indicating a relative relationship between the predetermined time axis and the time stamp.

3. The measuring device according to claim 2, wherein the relative information is a time that the time stamp is acquired on the predetermined time axis.

4. The measuring device according to claim 1, wherein the measurement time identification information includes a start time and an end time of the measurement time of each of the divided data items.

5. The measuring device according to claim 1, further comprising:
   a timer on which the predetermined time axis is based.

6. The measuring device according to claim 1, wherein the measurement time identification information is a relative time from a predetermined time point on the predetermined time axis.

7. The measuring device according to claim 1, wherein the measuring device is a video camera configured to generate animated data obtained by continuously recording images.

8. The measuring device according to claim 1, wherein the time stamp acquiring unit is further configured to acquire the time stamp based on relative information indicating a relative relationship between the predetermined time axis and the time stamp;

the signature generating unit is further configured to generate the electronic signature for the measurement time identification information, the relative information, and the time stamp, by using the private key specific to the measuring device; and the saving unit is further configured to save the relative information in association with the measurement data.

9. A measurement data editing device for generating new measurement data by using as an editing source the measurement data generated by the measuring device according to claim 1, the measurement data editing device comprising:

the data dividing unit configured to generate the divided data items by dividing the measurement data used as the editing source into the predetermined units;

a measurement data editing unit configured to generate the new measurement data based on at least one divided data item selected from the divided data items generated by the data dividing unit; and an edited data saving unit configured to save the new measurement data in association with the measurement time data, the time stamp, and the electronic signature associated with the measurement data used as the editing source.

10. The measurement data editing device according to claim 9, wherein a plurality of sets of the measurement data are used as editing sources to generate the new measurement data, and the edited data saving unit saves the new measurement data in association with the measurement time data, the time stamp, and the electronic signature associated with each of the sets of the measurement data used as the editing sources.

11. A measurement time verifying device for verifying an absolute time recorded in the measurement data generated by the measuring device according to claim 1, the absolute time indicating when the measurement information is measured, the measurement time verifying device comprising:

a signature verifying unit configured to verify the electronic signature associated with the measurement data;

a time stamp verifying unit configured to verify the time stamp associated with the measurement data;

the data dividing unit configured to generate the divided data items by dividing the measurement data into the predetermined units;

the feature quantity acquiring unit configured to acquire the feature quantities, each of the feature quantities identifying one of the divided data items generated by the data dividing unit;

a measurement time acquiring unit configured to acquire, from the measurement time data associated with the measurement data, the measurement time identification information recorded for each of the feature quantities; and an absolute time calculating unit configured to calculate the absolute time corresponding to each of the divided data items identified by the feature quantities based on the acquired measurement time identification information and a time recorded in the time stamp.

12. A measurement time verifying device for verifying an absolute time recorded in the measurement data generated by the measuring device according to claim 1, the absolute time indicating when the measurement information is measured, the measurement time verifying device comprising:

a signature verifying unit configured to verify the electronic signature associated with the measurement data;

a time stamp verifying unit configured to verify the time stamp associated with the measurement data;

the feature quantity acquiring unit configured to acquire a feature quantity identifying the measurement data;

a comparing unit configured to compare the feature quantity acquired and the feature quantities associated with the measurement data, and output a comparison result; and an absolute time calculating unit configured to calculate the absolute time based on the measurement time identification information, the relative information, and the time stamp associated with the measurement data, according to the comparison result outputted by the comparing unit.

13. The measuring device according to claim 1, wherein the data dividing unit is configured to divide the measurement data into the predetermined units after a recording operation of the measuring device, to generate the measurement data by continuously recording the measurement information over a period of time, is stopped.

14. A measuring method performed in a measuring device for generating measurement data by continuously recording measurement information, the measuring method comprising:

generating divided data items by dividing the measurement data into predetermined units, after the generating the measurement data by continuously recording the measurement information is completed;

acquiring feature quantities, each of the feature quantities identifying one of the divided data items generated in the generating;

acquiring a time stamp based on measurement time data, the measurement time data including the feature quantities and measurement time identification information of each of the divided data items, and the measurement time identification information defining a measurement time of each of the divided data items on a predetermined time axis;

generating an electronic signature for the measurement time data and the time stamp by encrypting, using a private key specific to the measuring device, a hash value, wherein the hash value is calculated from the time stamp and a hash list including the feature quantities and corresponding relative start and end times; and saving the measurement time data, the time stamp, and the electronic signature in association with the measurement data.

15. The measuring method according to claim 14, wherein the acquiring the time stamp includes acquiring the time stamp based also on relative information indicating a relative relationship between the predetermined time axis and the time stamp.

16. A computer-readable storage medium having embedded therein instructions, which when executed by a processor, causes a measuring device to execute the measuring method according to claim 14.

17. A measurement data editing method of generating new measurement data by using as an editing source the measurement data generated by the measuring method according to claim 14, the measurement data editing method comprising:

generating the divided data items by dividing the measurement data used as the editing source into the predetermined units;

generating the new measurement data based on at least one divided data item selected from the divided data items generated in the generating the divided data items; and saving the new measurement data in association with the measurement time data, the time stamp, and the electronic signature associated with the measurement data used as the editing source.

18. A computer-readable storage medium having embedded therein instructions, which when executed by a processor, cause the processor to perform the measurement data editing method according to claim 17.

19. A measurement time verifying method of verifying an absolute time recorded in the measurement data generated by the measuring method according to claim 14, the absolute time indicating when the measurement information is measured, the measurement time verifying method comprising:

verifying the electronic signature associated with the measurement data;

verifying the time stamp associated with the measurement data;

generating the divided data items by dividing the measurement data into the predetermined units;

acquiring the feature quantities, each of the feature quantities identifying one of the divided data items generated in the generating;

acquiring, from the measurement time data associated with the measurement data, the measurement time identification information recorded for each of the feature quantities; and calculating an absolute time corresponding to each of the divided data items identified by the feature quantities based on the acquired measurement time identification information and a time recorded in the time stamp.

20. A computer-readable storage medium having embedded therein instructions, which when executed by a processor, cause the processor to perform the measurement time verifying method according to claim 19.

21. The measuring method according to claim 14, wherein the generating the divided data items comprises dividing the measurement data into the predetermined units after a recording operation of the measuring device, to generate the measurement data by continuously recording the measurement information over a period of time, is stopped.

\* \* \* \* \*